W. IMHAEUSER,
Assignor to E. IMHAEUSER.
Watchman's Time Detector.
No. 9,387. Reissued Sept 28, 1880.
Fig: 1
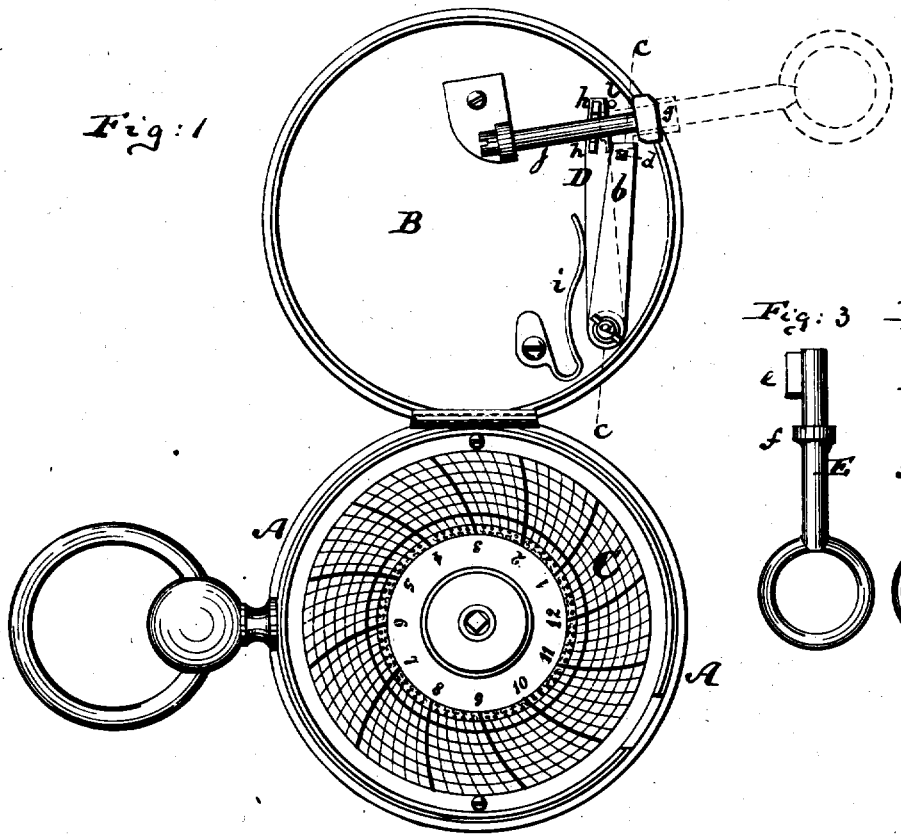
Fig: 3
Fig: 4
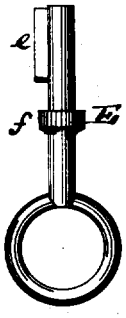
Fig: 2
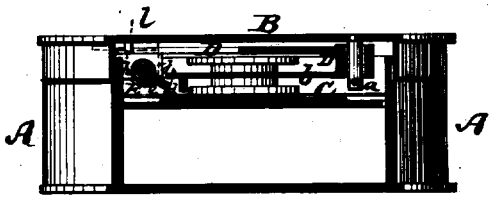
Witnesses:
John C. Tunbridge
Willy H. E. Schultz.
Inventor:
William Imhaeuser
by his attorney
A. v. Briesen

UNITED STATES PATENT OFFICE.

WILLIAM IMHAEUSER, OF BROOKLYN, NEW YORK, ASSIGNOR TO ELISE IMHAEUSER, OF SAME PLACE.

WATCHMAN'S TIME-DETECTER.

SPECIFICATION forming part of Reissued Letters Patent No. 9,387, dated September 28, 1880.

Original No. 172,630, dated January 25, 1876. Application for reissue filed June 15, 1880.

*To all whom it may concern:*

Be it known that I, WILLIAM IMHAEUSER, of Brooklyn, in the county of Kings and State of New York, have invented an Improved Watchman's Time-Detecter, of which the following is a specification.

Figure 1 is a top or plan view of my improved watchman's time-detecter, showing the lid folded open. Fig. 2 is a vertical section of the same closed, the line *c c*, Fig. 1, indicating the plane of section through the lid. Figs. 3 and 4 are plan views of two of the keys used therein.

Similar letters of reference indicate corresponding parts in all the figures.

This invention has for its object to improve and simplify watchmen's time-detecters of the class containing a rotary dial or paper disk; and it consists more particularly in placing within the folding lid of the instrument a hammer or pointing or marking instrument which is capable of vibrating in two directions, as hereinafter more fully described.

Similar devices have been previously used in the bodies of the time-detecters beneath the rotating dials or disks; but I have found that by placing these doubly-movable marking devices into the lids above the dials or disks the construction of the time-detecter is materially simplified, and that the parts are readily inspected and exposed to view by merely opening the lid, and are therefore also less liable to interfere with the clock-work from which the dials or disks receive their rotary motion.

The invention also consists in combining said hammer or marking-instrument in the lid of the instrument with the carrying-bar to which said hammer is attached and with which it moves horizontally in conjunction.

The invention also consists in providing said bar with a lug which straddles the key-arbor, and against which the keys are pushed to determine the position of the hammer at the time the mark is to be made.

In the drawings, the letter A represents the body or case of my improved time-detecter, and B the lid or cover of the same. The lid is usually hinged to the body, or otherwise so connected that it can be folded open, as in Fig. 1, or taken off to expose the paper dial or disk C to view. This paper dial or disk is, as usual, removable, and is for use secured within the shell A upon a rotary plate or holder, to which rotary motion is imparted by clock-work concealed within the shell. When the lid is closed down upon the shell, as in Fig. 2, it is locked thereto by a suitable lock, and can be unlocked by a suitable key.

D is a bar attached to the under side of the lid B by a pin, *a*, and connected with a spring or vibrating hammer, *b*. The bar D is capable of motion in a horizontal direction, while the spring or hammer *b* is also capable of being sprung or vibrated in a vertical direction. The spring or hammer is connected with the bar D in such a manner as to follow it in its horizontal motion. The spring or hammer *b* carries a projecting pin or marker, *d*, which has its lower end engraved or shaped to impress a peculiar mark on the paper dial or disk from the outside inward. A series of keys, E E, are employed to operate the bar D and the spring or hammer *b*.

Each key of the series pertaining to one instrument has a bit, *e*, differing in length from the bit *e* of every other key of the same series, and has also a shoulder, *f*, as shown. The shoulder *f* of one key is as far from the bit of such key as the shoulder *f* of every other key of the series is from its respective bit; yet, the bits varying in length, it follows that the distance between the shoulders and ends of the keys varies in all the keys.

The lid B is perforated to form a key-hole, as at *g*, through which the keys can be successively introduced. The key, when inserted through the key-hole, fits upon the arbor *j*, which is secured to the inner side of the lid, and which arbor is straddled or embraced by a perforated lug, *h*, which is attached to the bar D, as is clearly shown in Fig. 1. Each key is pushed, when inserted into the key-hole, until its shoulder *f* strikes the lid, the end of the key meanwhile striking the lug *h*, and thus the key moves the bar D horizontally against a spring, *i*, and by such motion also moves the hammer *b* horizontally until the marking-point *d* is over that portion of the dial which it is to mark. In the normal condition, and before a key is inserted, the spring *i* holds the bar D against a stop, *l*, which is securely placed into the lid, as shown in Fig. 1. As soon as the key has been properly introduced it is turned on its arbor *j* so that its bit will come in contact with the spring or hammer *b*, and thereby vibrate the latter vertically to throw or press its pointer or marker *d* into contact with the paper dial or disk C. A mark is thus made in the dial, indicating the time the key was introduced, and, by its distance from the center of the dial or disk, the key with which the mark was made.

The paper dial, when used, may be subdivided by radial curves and also by concentric rings in the usual manner, and, as indicated in Fig. 1, when, in place of the paper dial, a blank-paper disk is used, a row of types or dies will have to be secured in the case A, directly beneath the disk, to affect the paper when the same is pressed upon them by the marker or pointer *d*.

I am aware of Patent No. 138,084, which has a piercing-tool placed into the body of the instrument. Said device is not capable of application to a lid without slotting the top plate of the works and entering the pin therein, and produces, moreover, a mark which is easily imitated.

I claim—

1. In a watchman's time-detecter, the combination of the lid or cover B with the horizontally-movable bar D, and with the marking spring or hammer *b* attached thereto, all arranged to operate substantially as herein shown and described.

2. In combination with the lid or cover B of a watchman's time-detecter, the horizontally-movable bar D and spring *i*, and the horizontally and vertically movable hammer *b*, carrying the marker *d*, substantially as herein shown and described.

3. The combination of the lid B and bar D with the projecting lug *h* and key-arbor *j*, substantially as herein shown and described.

4. In a watchman's time-detecter, the combination of the lid with the horizontally and vertically movable spring-hammer *b*, for marking the dial on the outer face at different places with the single spring-hammer, substantially as specified.

5. The combination of the lid B and stop *l* with the bar D, spring *i*, and spring-hammer *b*, substantially as herein shown and described.

WILLIAM IMHAEUSER.

Witnesses:

WILLY G. E. SCHULTZ,
WILLIAM H. C. SMITH.